US009892749B2

(12) United States Patent
Qiang et al.

(10) Patent No.: US 9,892,749 B2
(45) Date of Patent: *Feb. 13, 2018

(54) WRITE HEAD OFFSET FOR SHINGLED MAGNETIC RECORDING (SMR) DISK DRIVES

(71) Applicant: SEAGATE TECHNOLOGY LLC, Cupertino, CA (US)

(72) Inventors: Jian Qiang, Singapore (SG); Xiong Liu, Singapore (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/373,891

(22) Filed: Dec. 9, 2016

(65) Prior Publication Data

US 2017/0092311 A1   Mar. 30, 2017

Related U.S. Application Data

(63) Continuation of application No. 14/746,744, filed on Jun. 22, 2015, now Pat. No. 9,583,127.

(51) Int. Cl.
*G11B 21/02* (2006.01)
*G11B 5/56* (2006.01)
*G11B 20/12* (2006.01)

(52) U.S. Cl.
CPC ............ *G11B 5/56* (2013.01); *G11B 20/1217* (2013.01); *G11B 2020/1238* (2013.01)

(58) Field of Classification Search
None
See application file for complete search history.

(56) References Cited

U.S. PATENT DOCUMENTS

| 6,185,063 B1 | 2/2001 | Cameron |
| 7,440,221 B2 | 10/2008 | Tsuchinaga et al. |
| 8,559,121 B2 | 10/2013 | Saito et al. |
| 8,699,159 B1 | 4/2014 | Malina |
| 8,896,961 B1 | 11/2014 | Harllee, III |
| 9,047,923 B1 | 6/2015 | Lum et al. |
| 9,583,127 B2 * | 2/2017 | Qiang ...................... G11B 5/56 |
| 2012/0176698 A1 | 7/2012 | Rub |

\* cited by examiner

*Primary Examiner* — K. Wong
(74) *Attorney, Agent, or Firm* — Holland & Hart LLP (57) ABSTRACT

Methods, systems, and apparatuses are described for provisioning storage devices. An example method includes determining a write status of an adjacent track that is adjacent to a target track of a shingled magnetic recording (SMR) disk drive. The method may further include determining an offset for a write head based on the write status of the adjacent track and positioning the write head according to the offset.

20 Claims, 5 Drawing Sheets

WRITE HEAD OFFSET FOR SHINGLED MAGNETIC RECORDING (SMR) DISK DRIVES

RELATED APPLICATION

This application is a continuation of U.S. patent application Ser. No. 14/746,744, filed on 22 Jun. 2015 and entitled WRITE HEAD OFFSET FOR SHINGLED MAGNETIC RECORDING (SMR) DISK DRIVES, now U.S. Pat. No. 9,583,127, issued 23 Feb. 2017, the disclosure of which is incorporated in its entirety by this reference.

SUMMARY

The described features generally relate to one or more improved systems, methods, and/or apparatuses for data storage, including writing data to a disk drive. Certain aspects of the present description employ various approaches for adjusting a position of a write head or write pointer for writing data to a shingled magnetic recording (SMR) track. For example, an offset may be determined that can increase an on-cylinder limit (OCLIM) for the write head when a track adjacent to the track to be written is unused. In one example method, a write status of an adjacent track that is adjacent to a target track of the SMR disk drive is determined. The write status may be determined from a track usage monitoring (TUM) table. An offset for a write head based on the write status of the adjacent track is determined using one or more of several different methods. A write head may be positioned, or the position of the write head may be adjusted, based on the offset. The data may be written to the target track using the write head at the adjusted position.

In some aspects, the described techniques improve write throughputs for SMR drives. Data may be written to the tracks much more efficiently, thus saving physical space on the drive. For example, tracks per inch calculations (TPIC) may be increased on the SMR drives to achieve higher area density. One way to gain areal density capability (ADC) is to reduce the OCLIM, which in turn reduces track encroachment due to off-track writing on the adjacent track. However, reducing the OCLIM may result in a drop in drive data throughput, especially due to large position error signal (PES) when the drive vibrates, such as when music is playing. In contrast, techniques described herein increase the OCLIM. This may improve write throughput and reduce off-track write retry. Reduction in write retries may improve the drive's lifespan and power consumption.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The present disclosure relates to positioning write heads for writing data to a shingled magnetic recording (SMR) drive. An SMR drive is a storage device that uses bands of overlapping tracks to increase storage density. SMR techniques may be used to write a new track that partially overlaps a previously written track, creating a shingled aspect to the tracks. The SMR technique leverages the fact that a width of a read head is typically narrower than the width of a write head. The storage density of an SMR drive is increased over conventional drives because the previously written tracks are thinner, thus allowing for higher track density. An SMR drive may contain a set of bands of overlapping tracks. The bands may be separated by an isolation space, which serves to reduce the number of tracks that need to be rewritten when a shingled track is rewritten.

Techniques described herein enable a position of a write head of an SMR drive to be adjusted when writing to a target track such that the written target track overlaps an adjacent track more than it would had the write head written in the original position. For example, if a track is unused (e.g., no data is written to it or previously stored data is to be wiped or trimmed), the track may take more overlapping by shingled writing from an adjacent track on a shingled side.

Techniques and systems described herein determine an offset that is then used to position the write head. When an unshingled side of the target track is unused, the OCLIM may be increased by shifting the writer head center to the unshingled side by the determined offset. In one example, a maximum OCLIM may be determined from a furthest off track position without impacting a minimum track pitch. The OCLIM may be increased on the unshingled side by any offset amount up to the maximum OCLIM. In some examples, the OCLIM may be increased such that the position of the write head lines up with a position of a read head.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
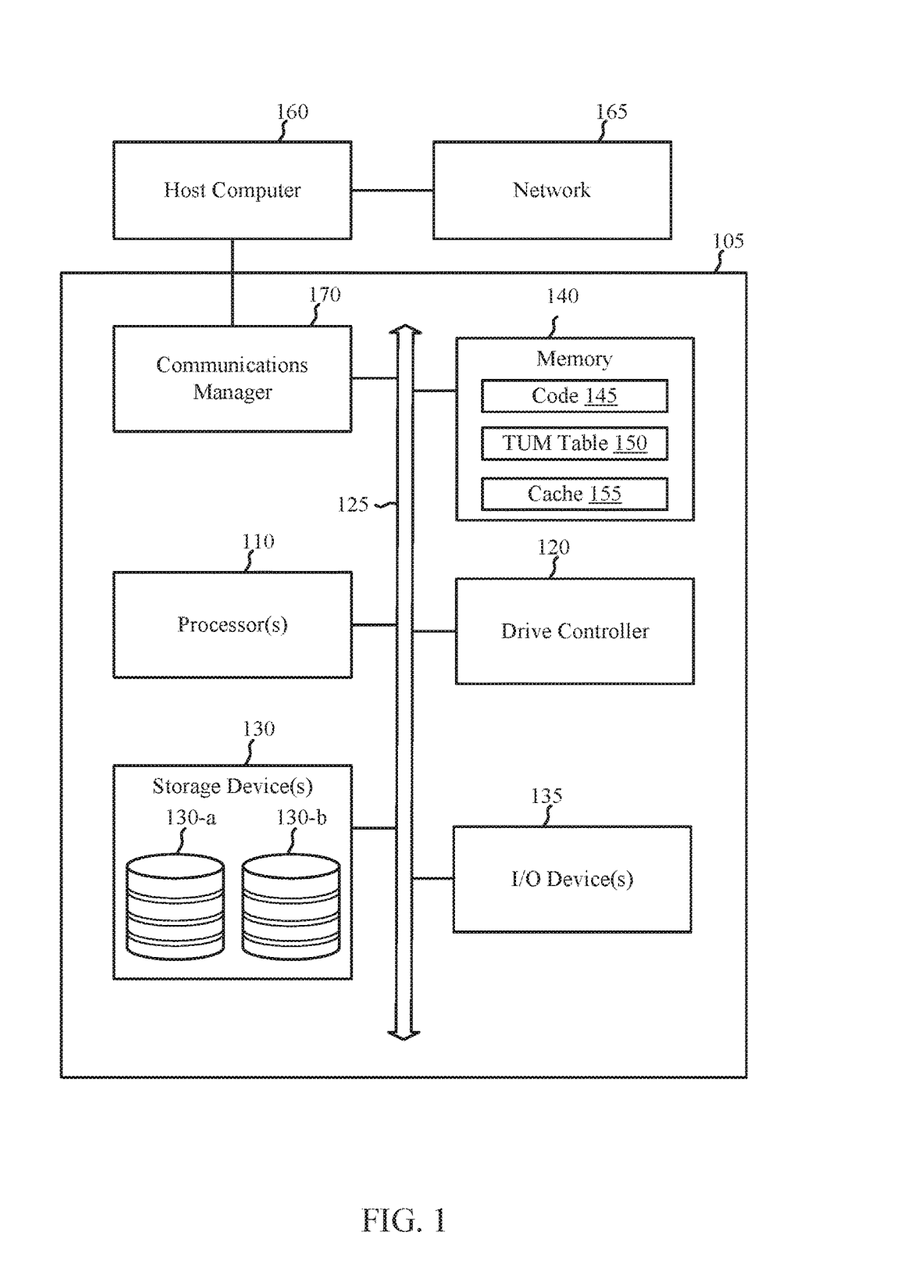
FIG. 1 shows a block diagram of an example data storage system, in accordance with various aspects of the present disclosure.

FIG. 1 shows a block diagram of an example data storage system 100, in accordance with various aspects of the present disclosure. The data storage system 100 may adjust an OCLIM for a write head of one or more storage devices. The data storage system 100 may include a data storage device 105.

The data storage system 100 may be coupled to a host computer 160 and/or one or more networks 165. FIG. 1 shows an example where the data storage device 105 is coupled directly to the host computer 160, which is in turn coupled to the network 165. In other examples, the data storage device 105 may be directly coupled with the network 165. In further examples, the data storage device 105 may be coupled to one or more host computers 160 and the network 165. The network 165 may provide user authentication, access authorization, tracking, Internet Protocol (IP) connectivity, and other access, routing, or mobility functions. The network 165 may be a wired or wireless network.

The data storage device 105 may include a processor 110, a drive controller 120, a storage device 130, and a memory 140. The data storage system 100 may also include one or more input/output (I/O) devices 135 and a communications manager 170. Each of these modules or devices may be in communication with each other, directly or indirectly, over one or more buses 125. The I/O devices 135 may include, for example, a keyboard, monitor, storage device, modem, pointing device, or user interface device.

The memory 140 may include random access memory (RAM) and/or read-only memory (ROM). The memory 140 may store computer-readable, computer-executable software/firmware code 145 containing instructions that are configured to, when executed, cause the processor 110 to perform various functions described herein related to data storage (e.g., to check a track status, determine a write head offset, reposition the write head according to the offset, etc.). Alternatively, the computer-readable, computer-executable software/firmware code 145 may not be directly executable by the processor 110, but be configured to cause the data storage system 100 (e.g., when compiled and executed) to perform various of the functions described herein.

The memory 140 may further include a track usage monitoring (TUM) table 150. The TUM table 150 may be a data store, such as a database or other table, that includes information related to track status for the one or more storage devices 130. The TUM table may be stored on a memory separate from the one or more storage devices that the TUM table tracks. In other examples, the TUM table 150 may be stored in a system partition of the SMR drive. On power up of the SMR drive, the TUM table 150 may be copied or moved to the memory 140 (e.g., DRAM).

Table 1 provides an example TUM table 150. The TUM table 150 stores the status of each track in the one or more storage devices 130. A value of 0 may indicate the track is unused (e.g., having a factory setting, previously written data no longer used, etc.). For example, when a trim command to truncate the data on a track is received, the status of the track may be changed to 0. A value of 1 may indicate that the track is used. Each row of the TUM table 150 may correspond with a band having multiple tracks on the SMR drive. Other organizations and layouts for the TUM table 150 may be used in other examples. The tracks may be in a shingled direction from lower track number to higher.

In the particular example of Table 1, each band has ten tracks. Tracks 6, 7, and 8 are used while the rest are empty. Table 2 provides an abridged version of the information stored in Table 1 in a different format.

TABLE 1

| 0 | 0 | 0 | 0 | 0 | 1 | 1 | 1 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

TABLE 2

Track 1 = Fresh
Track 2 = Fresh
Track 3 = Fresh
Track 4 = Fresh
Track 5 = Fresh
Track 6 = Used
Track 7 = Used
Track 8 = Used
Track 9 = Fresh
Track 10 = Fresh
. . . = Fresh
Track 50 = Fresh The memory 140 may also include a cache 155 that assists in writing data to the storage device 130 and temporarily stores information related to determining an offset. The cache 155 may also include indexing for data written to the one or more storage devices 130. The indexing may be used to locate data that a read command requests. The cache 155 may also temporarily store status values for one or more tracks until the status values are stored in the TUM table 150.

The processor 110 may include an intelligent hardware device, e.g., a central processing unit (CPU), a microcontroller, an application specific integrated circuit (ASIC), and the like. The processor 110 may process information received through the communications manager 170 from the host computer 160 or the network 165. The information may include, for example, read commands, write commands, and user data for storage. The processor 110 may handle, alone or in connection with the drive controller 120, various aspects of discovery procedures for the data storage system 100.

The drive controller 120 may be configured to perform and/or control some or all of the features and/or functions related to data storage for the data storage system 100. The drive controller 120 may process read and write commands. When the drive controller 120 receives a write command, the drive controller 120 may identify a target track to store the data. The drive controller 120 may determine a write status of a track that is adjacent to the target track. The adjacent track may be in an unshingled direction (e.g., a track that is overlapped by the target track). The drive controller 120 may determine an offset for a write head based on the write status of the adjacent track. Once the offset is determined, the drive controller 120 may position the write head according to the offset. For example, the drive controller 120 may cause a servomechanism that controls the position of the write head of a storage device 130 to position the write head according to the offset.

The drive controller 120, or portions thereof, may include a processor, and/or some or all of the functions of the drive controller 120 may be performed by the processor 110 and/or in connection with the processor 110. The drive controller 120 may include one or more integrated circuits. The drive controller 120 may interface directly or indirectly with the one or more storage devices 130.

The storage devices 130 may include one or more volumes (e.g., disk drives) of memories of various types and sizes. For example, at least one of the storage devices 130 may be a magnetic disk drive that uses SMR techniques. In further examples, the storage devices 130 may include an optical disk or a solid-state flash memory device. As shown in FIG. 1, the storage device 130 includes storage devices 130-*a* and 130-*b*. The storage devices 130-*a*, 130-*b* may have data written to them according to techniques described herein. For example, the storage devices 130-*a*, 130-*b* may have one or more tracks written using offsets as described herein. The overlap between adjacent tracks may be larger than conventional SMR drives.

The processor 110 may send one or more host commands (e.g., a read command or a write command) to the drive controller 120 to store or retrieve user data from the storage device 130. The drive controller 120 may receive the commands and/or user data from the processor 110 and manage execution of the commands to retrieve or store data from the storage device 130. For example, the drive controller 120 may receive a write command and store user data in the storage device 130 according to the offset for the target track.

Figure 2:
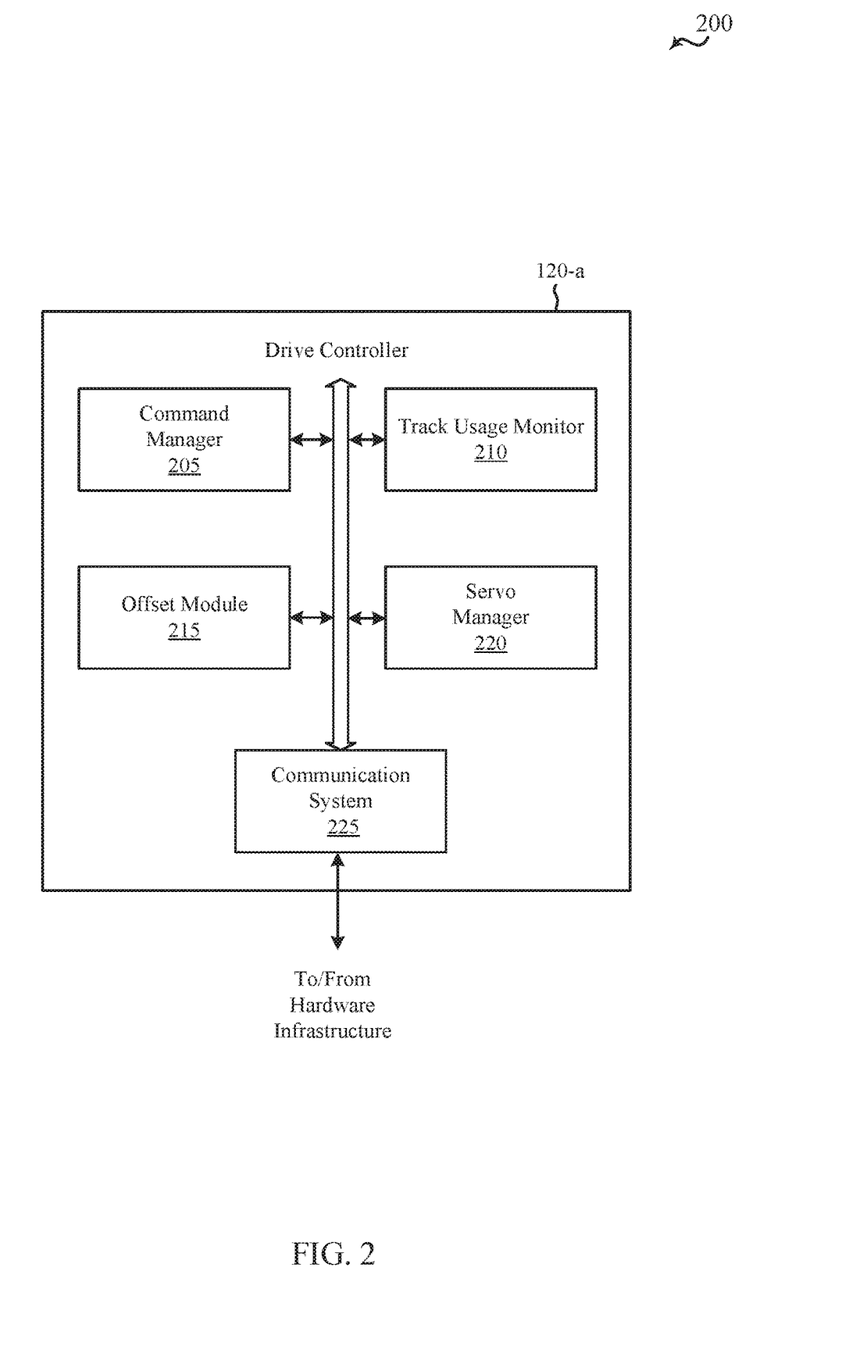
FIG. 2 shows a block diagram of an example drive controller, in accordance with various aspects of the present disclosure.

FIG. 2 shows a block diagram of an example drive controller 120-*a*, in accordance with various aspects of the present disclosure. In some examples, the drive controller 120-*a* may be an example of one or more aspects of the drive controller 120 described with reference to FIG. 1. The drive controller 120-*a* may be configured to implement or facilitate at least some of the data storage features and functions described with reference to FIG. 1.

The components of the drive controller 120-*a* may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, field programmable gate arrays (FPGAs), and other Semi-Custom ICs), which may be programmed in any manner known in the art. The functions of each component may also be implemented, in whole or in part, with instructions embodied in a memory, formatted to be executed by one or more general or application-specific processors.

The drive controller 120-*a* may monitor, control, or otherwise manage one or more aspects of data storage for one or more storage devices, such as the storage devices 130 of FIG. 1. The drive controller 120-*a* may include a command manager 205, a track usage monitor 210, an offset module 215, and a servo manager 220. The drive controller 120-*a* may also include a communication system 225 that may be used to receive and send various types of data and/or command signals over a wired or wireless connection to one or more devices such as a data storage system, a host computer, or a network, such as shown in the data storage system 100 described with reference to FIG. 1.

The command manager 205 may manage host commands for a storage device. The host commands may include, for example, read commands and write commands. Responsive to a write command, the command manager 205 may cause the offset module 215 to determine an offset for writing the user data to a target track of the storage device. The command manager 205 may write the user data to the target track at the position adjusted by the offset. When track is filled, a known amount of physical space will be used. The command manager 205 may report the amount of physical space and indexing of the track for future read access. The command manager 205 may also indicate to the track usage monitor 210 that the target track is used when it writes to the track. The command manager 205 may write the data to one or more tracks of the physical space according to the size of the data.

The track usage monitor 210 may manage one or more TUM tables for one or more storage devices. The track usage monitor 210 may create a TUM table for an SMR drive and keep the TUM table updated as data is written to or deleted from the tracks. For example, when a track of an SMR drive is written to, the track usage monitor 210 may update the TUM table corresponding to that SMR drive to reflect the status of the track. That is, when an unused track is written to, the track usage monitor 210 may change the status of the track in the TUM table from 0 to 1. In other examples, other methods of indicating the track status are used.

The track usage monitor 210 may also check a TUM table for the status of a track that is adjacent to a target track. The track usage monitor 210 may query the TUM table for a status of one or more tracks at the prompting of the command manager 205. In some examples, the TUM table indicates a shingling direction of the SMR drive. The track usage monitor 210 may determine which tracks are on a shingled side of the target track and which tracks are on an unshingled side of the target track. In some examples, the track usage monitor 210 provides track status information to the command manager 205 from which to select a target track.

When an adjacent track of the target track is unused, the offset module 215 may determine an offset for the target track. For example, if a track is unused, any factory default data can be sent when the host computer is reading the track. Because the track is unused, it may take more overlapping for shingled writing than other adjacent tracks in the unshingled direction. For example, assuming the tracks are shingled from left to right, when the track on the left side of the target track is unused, the OCLIM may be increased by shifting the center of the write head to the left side by an offset. The OCLIM may be increased by taking the previous OCLIM and adding the offset. This example is described further with regard to FIG. 3A below.

In another example, the offset module 215 may determine a maximum OCLIM by determining the furthest off track position that may be used to write to the target track without impacting a minimum track pitch. In such an example, the OCLIM may be increased substantially when there is an unused track in front of (e.g., in the unshingled direction) the target track. In turn, write throughput may be increased. This example is described further with regard to FIG. 3B below.

In some examples, the offset may be the same for each track with an unused adjacent track within an SMR drive. In such a case, the offset module 215 may determine an offset only once per SMR drive. In other examples, the offset module 215 determines an offset for each target track in the SMR with an unused adjacent track or an offset for each band of tracks.

The servo manager 220 may communicate with a servomechanism that controls the position of the write and/or read heads. For example, the servo manager 220 may provide an offset instruction to the one or more storage devices to cause the servomechanism to position the write head according to an offset for a particular target track. The servo manager 220 may provide the offset for a target track that is determined by the offset module 215 to the storage device when the command manager 205 indicates a write command has been received.

The communication system 225 may send and receive the various types of data and/or command signals (e.g., read and write commands, offset positioning commands, user data, etc.) over a wired or wireless connection to one or more devices such as a data storage system. In one example, the communication system 225 forwards an offset instruction to one or more storages devices.

The drive controller 120-*a* therefore selects a target track, determines whether an adjacent track on an unshingled side of the target track is unused, determines an offset, positions a write head of a storage device based at least in part on the offset, and writes data to the target track at the offset position.

Figure 3A:
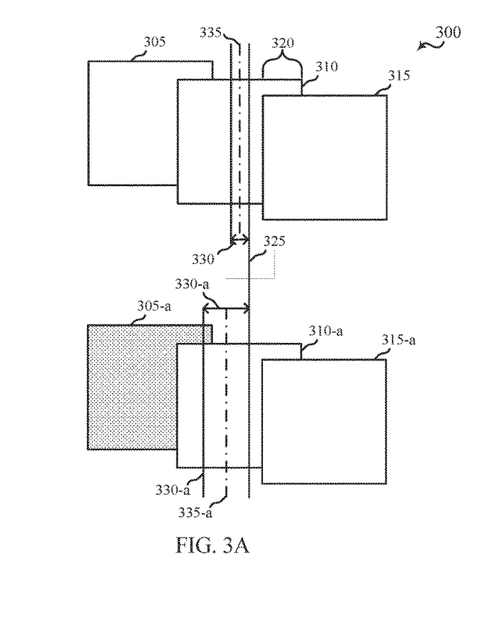
FIGS. 3A-3B show a conceptual diagram illustrating write offsets, in accordance with various aspects of the present disclosure.

FIG. 3A shows a conceptual diagram 300 illustrating write offsets, in accordance with various aspects of the present disclosure. The diagram 300 shows two instances of three tracks of a storage device. The first instance illustrates an unadjusted write head position and the second instance illustrates an adjusted write head position. The storage device may be an SMR drive and may be an example of one or more aspects of the storage devices 130 described with reference to FIG. 1.

The first instance of the tracks include an adjacent track 305, a target track 310, and another adjacent track 315. The shingled direction in this example is from left to right. Thus, the adjacent track 305 is on the unshingled side of the target track 310 and the adjacent track 315 is on the shingled side. The target track 310 and the adjacent track 315 have a track overlap 320. An unadjusted write track center 335 represents a conventional position of the write head. An unadjusted OCLIM 330 is shown centered around the unadjusted write track center 335. The unadjusted OCLIM 330 may be, for example, approximately 10% of the track width.

The second instance of the tracks include an adjacent track 305-*a*, a target track 310-*a*, and another adjacent track 315-*a*. In the second instance, an adjusted OCLIM 330-*a* is larger than the unadjusted OCLIM 330 by a determined offset. In this example, the adjacent track 305-*a* is unused, as indicated by the shading. Because the adjacent track 305-*a* on the unshingled side of the target track 310-*a* is unused, the OCLIM 330-*a* may be increased by shifting the center of the write head (e.g., the unadjusted write track center 335) to the left side by the offset. The OCLIM 330-*a* may be adjusted by taking the unadjusted OCLIM 330 and adding the offset. For example, if the offset module 215 selects an offset of 5%, the OCLIM 330-*a* can be 15%. The write head is shifted to the left for the new OCLIM and is now aligned with write track center 335-*a*.

Figure 3B:
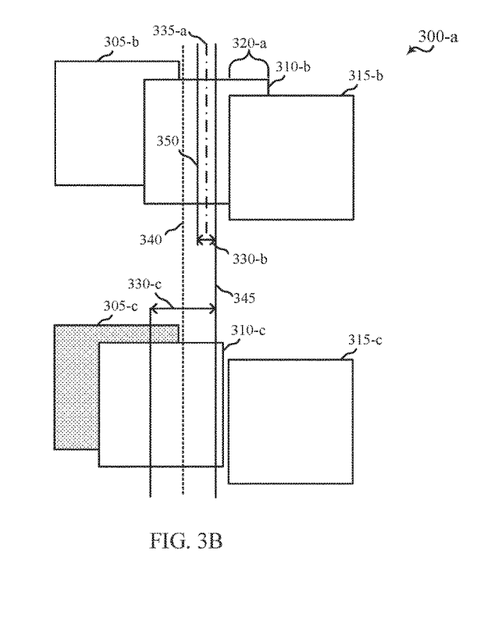

FIG. 3B shows a conceptual diagram 300-*a* illustrating write offsets, in accordance with various aspects of the present disclosure. The diagram 300-*a* shows two instances of three tracks of a storage device. The first instance illustrates an unadjusted write head position and the second instance illustrates an adjusted write head position. The storage device may be an SMR drive and may be an example of one or more aspects of the storage devices 130 described with reference to FIG. 1.

The first instance of the tracks includes an adjacent track 305-*b*, a target track 310-*b*, and another adjacent track 315-*b*. Like FIG. 3A, the shingled direction in this example is also from left to right, making the adjacent track 305-*b* on the unshingled side of the target track 310-*b* and the adjacent track 315-*b* on the shingled side. The target track 310-*b* and the adjacent track 315-*b* have a track overlap 320-*a*. An unadjusted write track center 335-*a* represents the conventional position of the write head. An unadjusted OCLIM 330-*b* is shown centered around the previous write track center 335-*a*. The unadjusted OCLIM 330-*b* may be, for example, approximately 10%. A read track center 340 is shown to illustrate a position a read head may take when reading the track 310-*b*.

The second instance of the tracks includes an adjacent track 305-*c*, a target track 310-*c*, and another adjacent track 315-*c*. In the second instance, an adjusted OCLIM 330-*c* is larger than the unadjusted OCLIM 330-*b* by a determined offset. In this example, the adjacent track 305-*c* is unused, as indicated by the shading, so the OCLIM 330-*c* may be increased by shifting the center of the write head to the left side by an offset. The OCLIM 330-*c* may be set by taking the unadjusted OCLIM 330-*b* and adding the offset, for example.

A maximum OCLIM can be determined by the furthest off track position that does not impact a minimum track pitch. When off track to the shingled side (e.g., right side), the write head cannot go beyond a right boundary 345 of the unadjusted OCLIM 330-*b*. On the shingled side, the write head cannot go beyond a left boundary 350 of the unadjusted OCLIM 330-*b* plus the amount of track overlap 320-*a*.

In one illustrative example, the unadjusted OCLIM 330-*b* is 10% and the track overlap 320-*b* is 30%, with percentages in terms of the width of the target track 310-*c*. The maximum off track is the track overlap (30%) plus the unadjusted OCLIM (10%), resulting in a maximum off track of 40%.

In other examples, the maximum OCLIM 330-*c* may be given as Equation 1.

$$\mathrm{max}OCLIM = \frac{1}{2}(\text{track overlap} + 2*\text{unadjusted } OCLIM) \quad (1)$$

Using the values from the example given above with Equation 1, the maximum OCLIM would be 25%. When the OCLIM is increased to 25%, the write throughput of the target track 310-*c* will be greater than the write throughput of the target track 310-*b*.

An offset value may be determined as the maximum OCLIM minus the unadjusted OCLIM. Using the above values, the offset may be 15% and the write head is repositioned along the read track center 340. Thus, the techniques described herein may increase the OCLIM dynamically when there is an unused track in front of the target track 310-*c*, which results in increased write throughput. The OCLIM may be adjusted to be equal to or less than a maximum OCLIM.

Figure 4:
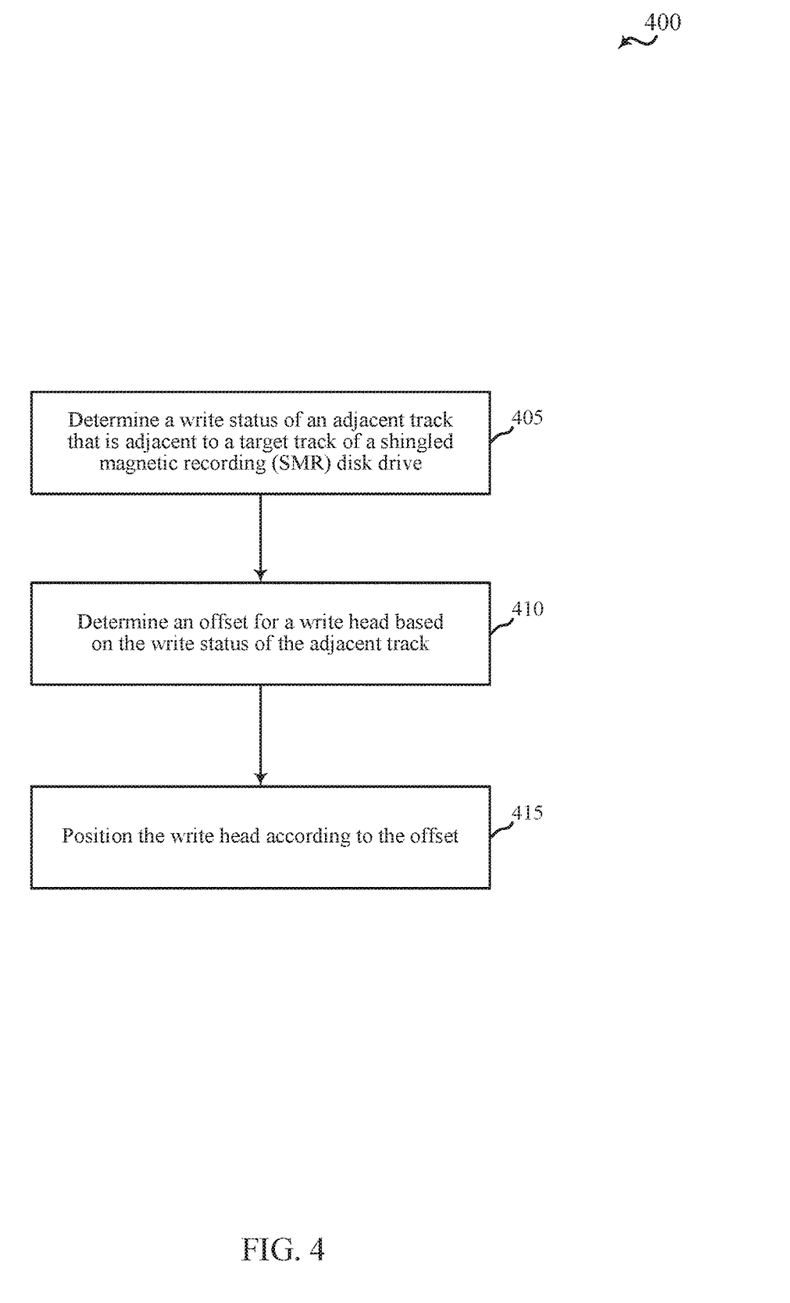
FIG. 4 is a flow chart illustrating an example method for data storage, in accordance with various aspects of the present disclosure.

FIG. 4 is a flow chart illustrating an example method 400 for data storage, in accordance with various aspects of the present disclosure. For clarity, the method 400 is described below with reference to aspects of one or more of the drive controllers 120 described with reference to FIGS. 1 and 2, and/or aspects of the system 100 described with reference to FIG. 1. In some examples, a drive controller may execute one or more sets of codes to control the functional elements of the storage device to perform the functions described below. Additionally or alternatively, the drive controller may perform one or more of the functions described below using special-purpose hardware.

At block 405, the method 400 may include determining a write status of an adjacent track that is adjacent to a target track of an SMR disk drive. The disk drive may be any SMR storage device, such as aspects of one or more of the storage devices 130 described with reference to FIG. 1. The adjacent track may be on an unshingled side of the target track.

At block 410, the method 400 may also include determining an offset for a write head based on the write status of the adjacent track. In some examples, the method 400 further includes determining the write status of the adjacent track from a track usage monitoring (TUM) table. In other examples, the method 400 may include determining a track overlap between the adjacent track and the target track. Determining the offset may be based at least in part on the track overlap.

In some examples of the method 400, determining the offset further includes determining half of a sum of the track overlap and two times an unadjusted OCLIM. When the adjacent track is on a shingled side of the target track, the method 400 may include setting the offset to zero.

At block 415, the method 400 may further include positioning the write head according to the offset. In some examples, positioning the write head may further include shifting the write head according to the offset towards the adjacent track when the track status indicates the adjacent track is unused. In some examples, positioning the write head according to the offset further includes positioning the write head by adding the offset to an unadjusted OCLIM. Positioning the write head may include shifting the write center of the write head by the offset to the unshingled side of the target track, wherein the offset is equal to or less than an adjusted OCLIM. Further, positioning the write head may also include shifting a write center of a write head by the offset to an unshingled side of the target track, wherein the offset is equal to or less than an unadjusted OCLIM.

The method 400 may further include receiving a write command to write data to the target track and writing to the target track using the write head positioned according to the offset. The method 400 may further include updating a TUM table based on the writing to the target track.

The operations at block 405, 410, and/or 415 may be performed using the drive controller 120 described with reference to FIGS. 1 and 2. Thus, the method 400 may provide for management of device storage. It should be noted that the method 400 is just one implementation and that the operations of the method 400 may be rearranged or otherwise modified such that other implementations are possible.

Figure 5:
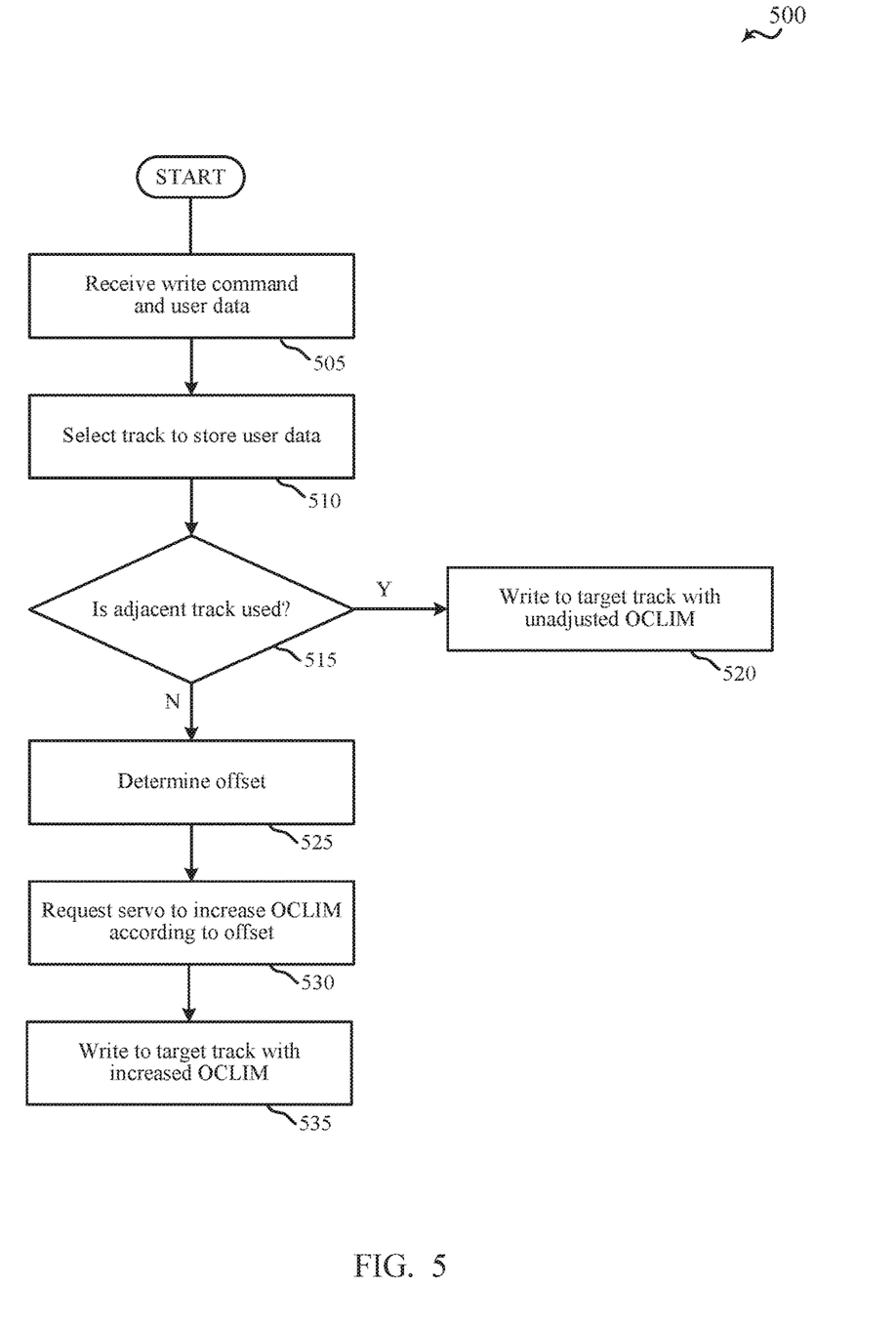
FIG. 5 is a flow chart illustrating another example method for data storage, in accordance with various aspects of the present disclosure.

FIG. 5 is a flow chart illustrating another example of a method 500 for data storage, in accordance with various aspects of the present disclosure. For clarity, the method 500 is described below with reference to aspects of one or more of the drive controllers 120 described with reference to FIGS. 1 and 2, and/or aspects of the system 100 described with reference to FIG. 1. In some examples, a drive controller may execute one or more sets of codes to control the functional elements of the storage device to perform the functions described below. Additionally or alternatively, the drive controller may perform one or more of the functions described below using special-purpose hardware.

The method 500 may begin at block 505 with receiving a write command and user data. The write command may instruct the drive controller to write the user data to a storage device. The method 500 proceeds at block 510 to select one or more target tracks to which to write the user data. Even though more than one target track may be selected to store the user data, the method 500 may be applied to a first track of the tracks, wherein the first track is the track furthest on the unshingled side. The techniques herein may also apply to tracks separated by an isolation space.

At block 515, the method 500 includes determining whether an adjacent track is used. The adjacent track may be on an unshingled side, for example. If the adjacent track on the unshingled side is used, the method 500 proceeds to block 520 and writes the target track using the unadjusted OCLIM.

However, if the adjacent track on the unshingled side is unused, the method 500 proceeds to block 525. At block 525, the method 500 determines an offset by which to increase the OCLIM. The offset may be based on a maximum OCLIM and an unadjusted OCLIM, for example. In other examples, the offset may be determined using other techniques.

Once the offset is determined, the method 500 may include requesting a write head servomechanism ("servo") to increase the OCLIM according to the offset at block 530. Thus, the servo may reposition the write head by the offset, which may be aligned with a read head position for the target track. At block 535, the method 500 may write the user data to the target track using the increased OCLIM.

The operations at block 505, 510, 515, 520, 525, 530, and/or 535 may be performed using the drive controller described with reference to FIGS. 1 and 2. Thus, the method 500 may provide for data storage. It should be noted that the method 500 is just one implementation and that the operations of the method 500 may be rearranged or otherwise modified such that other implementations are possible.

In some examples, aspects from two or more of the methods 400 and 500 may be combined. It should be noted that the methods 400 and 500 are just example implementations, and that the operations of the methods 400 and 500 may be rearranged or otherwise modified such that other implementations are possible.

The detailed description set forth above in connection with the appended drawings describes examples and does not represent the only examples that may be implemented or that are within the scope of the claims. The term "example," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

The foregoing description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, Electrically Erasable Programmable Read-Only Memory (EEPROM), flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein, but is to be accorded the broadest scope consistent with the principles and novel features disclosed herein.

What is claimed is:

1. A method for data storage, comprising:
    determining a write status of an adjacent track that is adjacent to a target track of a shingled magnetic recording (SMR) disk drive;
    based on the write status of the adjacent track, shifting a write center of a write head by an offset to an unshingled side of the target track to increase an on-cylinder limit (OCLIM).

2. The method of claim 1, wherein determining the write status of the adjacent track further comprises:
    determining the write status of the adjacent track from a track usage monitoring (TUM) table.

3. The method of claim 1, wherein shifting the write center of the write head further comprises:
    shifting the write head according to the offset towards the adjacent track when the write status indicates the adjacent track is unused.

4. The method of claim 1, further comprising:
    determining a track overlap between the adjacent track and the target track; and
    determining the offset based at least in part on the track overlap.

5. The method of claim 4, further comprising:
    determining the offset using half of a sum of the track overlap and two times an unadjusted on-cylinder limit (OCLIM).

6. The method of claim 1, wherein shifting the write center of the write head further comprises:
    positioning the write head by adding the offset to an unadjusted on-cylinder limit (OCLIM).

7. The method of claim 1, wherein the offset amount is up to an amount that is a maximum on-cylinder limit (OCLIM).

8. The method of claim 1, wherein the offset is equal to or less than an unadjusted on-cylinder limit (OCLIM).

9. The method of claim 1, wherein determining the offset further comprises:
    setting the offset to zero when the adjacent track is on a shingled side of the target track.

10. The method of claim 1, further comprising:
    receiving a write command to write data to the target track;
    writing to the target track using the write head positioned according to the offset; and
    updating a track usage monitoring (TUM) table based on the writing to the target track.

11. An apparatus, comprising:
    at least one processor; and
    memory coupled to the at least one processor, wherein the memory includes instructions that are executable by the at least one processor to:
        determine a write status of an adjacent track that is adjacent to a target track of at least one data storage medium;
        based on the write status of the adjacent track, shift a write center of a write head by an offset to an unshingled side of the target track to increase an on-cylinder limit (OCLIM).

12. The apparatus of claim 11, wherein the memory further includes instructions that are executable by the at least one processor to determine the write status of the adjacent track from a track usage monitoring (TUM) table.

13. The apparatus of claim 11, wherein the memory further includes instructions that are executable by the at least one processor to:
shift the write head according to the offset towards the adjacent track when the write status indicates the adjacent track is unused.

14. The apparatus of claim 11, wherein the memory further includes instructions that are executable by the at least one processor to:
determine a track overlap between the adjacent track and the target track, further comprising determining the offset based at least in part on the track overlap.

15. The apparatus of claim 11, wherein shifting the write center of the write head by an offset further comprises:
position the write head by adding the offset to an unadjusted on-cylinder limit (OCLIM).

16. The apparatus of claim 11, wherein the memory further includes instructions that are executable by the at least one processor to:
receive a write command to write data to the target track;
write to the target track using the write head positioned according to the offset; and
update a track usage monitoring (TUM) table based on the writing to the target track.

17. A system, comprising:
at least one data storage medium to store data in a shingled manner;
a write head to write data to the data storage medium;
a read head to read data from the data storage medium;
at least one processor; and
memory coupled to the at least one processor, wherein the memory includes instructions that are executable by the at least one processor to:
determine a write status of an adjacent track that is adjacent to a target track of the at least one data storage medium;
based on the write status of the adjacent track, shift a write center of the write head by an offset to align the write head with the read head.

18. The system of claim 17, further comprising:
a memory device to store a track usage monitoring (TUM) table that includes a write status for each track of the at least one data storage medium,
wherein the memory further includes instructions that are executable by the at least one processor to determine the write status of the adjacent track from the TUM table.

19. The system of claim 17, wherein the memory further includes instructions that are executable by the at least one processor to:
shift the write head according to the offset towards the adjacent track when the write status indicates the adjacent track is unused.

20. The system of claim 17, wherein the memory further includes instructions that are executable by the at least one processor to:
determine a track overlap between the adjacent track and the target track; and
determine the offset based at least in part on the track overlap.

* * * * *